(12) United States Patent
Brandon

(10) Patent No.: US 8,684,430 B1
(45) Date of Patent: Apr. 1, 2014

(54) ADJUSTAB CUP HOLDER

(71) Applicant: Stan Brandon, Sanger, TX (US)

(72) Inventor: Stan Brandon, Sanger, TX (US)

(*) Notice: Subject to any disclaimer, the term of this patent is extended or adjusted under 35 U.S.C. 154(b) by 0 days.

(21) Appl. No.: 13/573,678

(22) Filed: Oct. 3, 2012

(51) Int. Cl.
*A47J 45/00* (2006.01)

(52) U.S. Cl.
USPC ................ 294/31.2; 294/150; 294/165

(58) Field of Classification Search
USPC .......... 294/31.2, 27.1, 32–33, 165, 148–150; 220/737–739, 752, 758, 666, 677, 903; 215/396; D7/623, 625, 628
See application file for complete search history.

(56) References Cited

U.S. PATENT DOCUMENTS

| | | | | | |
|---|---|---|---|---|---|
| 4,796,936 | A | * | 1/1989 | Sherin | 294/31.2 |
| 4,928,873 | A | * | 5/1990 | Johnson | 220/738 |
| 5,373,980 | A | * | 12/1994 | Rowell et al. | 224/240 |
| 5,894,780 | A | * | 4/1999 | Taniguchi | 71/9 |
| 6,073,796 | A | * | 6/2000 | Mogil | 220/592.17 |
| D467,418 | S | * | 12/2002 | Perron | D3/229 |

* cited by examiner

*Primary Examiner* — Stephen Vu
(74) *Attorney, Agent, or Firm* — David G. Moore

(57) ABSTRACT

An adjustable cup holder which consists of a flexible wrap, a handle, a first adjustable strap, and second adjustable strap and a ring which may be used to safely hold a beverage container or cup. The handle is attached to the flexible wrap as are the first and second adjustable straps. The flexible wrap is placed around a beverage container and the end of the first and second adjustable strap are inserted through the rings, tightened and affixed to the flexible wrap. The handle is now securely affixed to the beverage container allowing the consumer to safely and conveniently handle the beverage container.

4 Claims, 2 Drawing Sheets

ADJUSTAB CUP HOLDER

CROSS-REFERENCE TO RELATED APPLICATIONS

This application seeks priority to Provisional Application No. 61/628,816 filed on Nov. 7, 2011 which is incorporated herein by reference as if fully set forth.

STATEMENT REGARDING FEDERALLY SPONSORED RESEARCH OR DEVELOPMENT

No part of the invention disclosed herein was the subject of federally sponsored research or development.

THE NAMES OF THE PARTIES TO A JOINT RESEARCH AGREEMENT

None

REFERENCE TO A SEQUENCE LISTING

Not applicable.

BACKGROUND OF THE INVENTION

1. Field of the Invention

The field of the invention disclosed herein is a cup holder with a handle which can be adjusted to securely fit around a variety of beverage containers.

2. Description of the Related Art

Liquid containers are used to enable individuals to consume a variety of beverages. The beverage container may come in a variety of sizes and shapes. Some beverage containers come in a semi-conical shape in which the bottom of the beverage container is narrower than the top of the beverage container. Other beverage containers may be constructed with parallel walls forming an elongated cylinder with a sealed bottom part and with or without a closable opening at the top of the beverage container. Additionally, beverage containers come in a variety of shapes and are constructed from a variety of materials. Some beverage containers are constructed from materials which keep hot beverages warm and cold beverages cool. Other beverages may be contracted from a flexible material such as molded plastic or Styrofoam.

In order to consume the beverage contained in the beverage container, the consumer must take the beverage container in hand and move the beverage container into juxtaposition with the consumer's mouth. In some circumstances the beverage may contain a hot beverage which renders the beverage container hot to the touch making the beverage container painful to hold and consume the beverage. Conversely, the beverage container may contain a cold beverage which may make the beverage container cold and painful to the touch. In other circumstances, the beverage container may be constructed from material which bends easily making it difficult to grasp the cup without spilling the beverage. The beverage container may be constructed from materials which, if grabbed to tightly, will break resulting in spillage of the beverage. Experience has taught that when a hot beverage is spilled from a beverage container, physical injury may result to the consumer. What is needed in the art is a cup holder which is adjustable to fit many types of beverage containers and is fitted with a handle or prehensile attachment to permit the consumer to hold the beverage container by way of the handle or prehensile attachment and not the beverage container itself.

BRIEF DESCRIPTION OF THE INVENTION

The invention disclosed herein is a cup holder which is adjustable to fit many types and sizes of beverage container and is fitted with a handle or prehensile attachment to permit the consumer to hold the beverage container by way of the handle or prehensile attachment and not the beverage container itself. Specifically, one embodiment of the invention disclosed herein consists of a handle attached to a flexible wrap designed and constructed to fit around a variety of beverage containers. Attached to the flexible wrap is a strap to which one end of the strap is fastened to one side of the flexible wrap. Attached to the wrap approximately circumferentially from the first strap is one end of another strap. Both straps are constructed of a hook and loop fabric such as Velcro™ (a registered trademark of Velcro Industries, B. V.) material. The free end of both straps is adjustably connected through a rectangular ring. When the flexible wrap is fitted around a beverage holder the free end of the two straps are tightened so that the flexible wrap fits securely around the beverage container. When the flexible wrap is fitted around the beverage container the straps are then secured by the hook and loop fabric. The consumer can now grab the beverage container by the handle and consume the beverage without spilling the beverage.

DESCRIPTION OF THE DRAWING/FIGURES

A better understanding of the embodiments of the invention disclosed herein may be had by examination of the drawing figures attached hereto:

DETAILED DESCRIPTION OF THE INVENTION

The invention disclosed herein is an adjustable cup holder to which a handle has been attached. Specifically, the embodiments of the invention disclosed herein consist of a flexible wrap which may be made from plastic or other sturdy but flexible material and is designed and constructed to wrap around a multitude of differently sized and shaped containers. Attached to the flexible wrap is a handle which permits the consumer to handle the beverage container or cup without actually touching the beverage container/cup. Also attached are two straps made of hook and loop fabric located on either side of the flexible wrap and located at approximately 90° from the handle. One end of each strap is affixed to the wrap and the other end of each strap is free. When the flexible wrap is positioned securely around the beverage holder/cup, the free end of the straps made of hook and loop fabric are extended through a rectangular ring and folded back on to themselves. The straps are tightened and secured around the cup by the hook and loop fabric. The adjustable cup holder is now ready for the consumer to drink the beverage.

Figure 1:
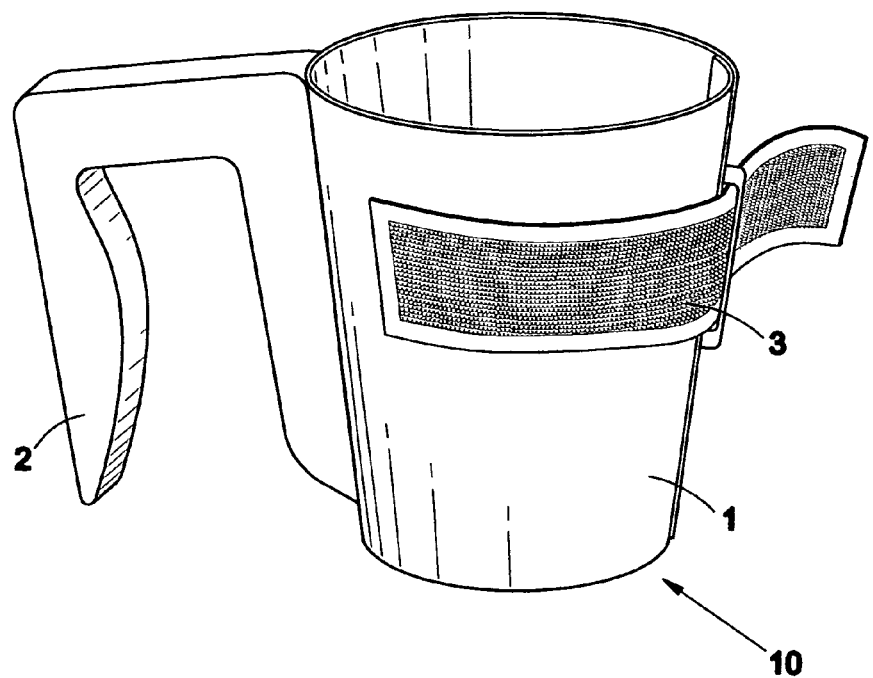
FIG. 1 is a right side view of the adjustable cup holder disclosed herein.

As shown in FIG. 1, the flexible wrap 1 of the adjustable cup holder 10 is approximately cylinder-shaped to which a handle 2 is attached. Also attached to the flexible wrap 1 is a first strap 3 constructed from hook and loop fabric which helps to adjust the flexible band 1 around the beverage container and to fix the flexible wrap 1 into place. One end of the first strap 3 is affixed to the wrap 1. The opposite end of the first strap 3 is free.

Figure 2:
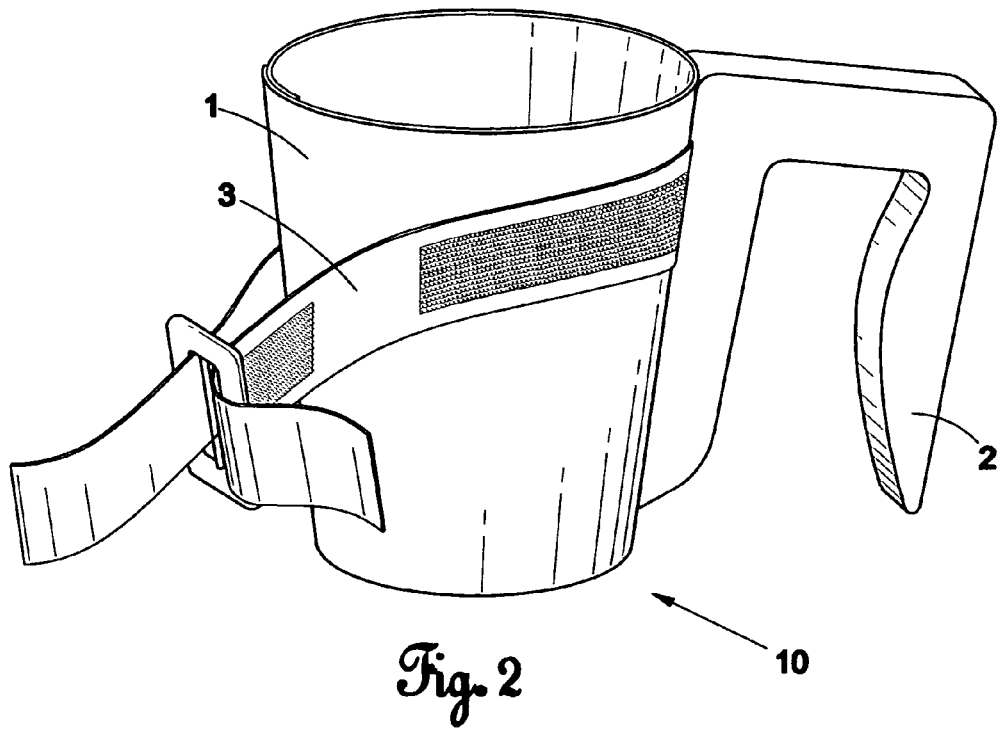
FIG. 2 is a left side view of the adjustable cup holder disclosed herein.

FIG. 2 shows the side opposite the view shown by FIG. 1 of the adjustable cup holder 10. Attached to the flexible wrap 1 is a second strap 4 located approximately 180° from the first strap 3 and approximately 90° from the handle 2. Like the first strap 3, the second strap 4 is constructed from hook and loop fabric. As in first strap 3, one end of the second strap 4 is attached to the wrap 1 and the opposite end of the second strap 4 is free.

The side of the flexible wrap 1 which is located approximately 180° from the handle 2 and approximately 90° from the location on the flexible wrap 1 where the first strap 3 and second strap 4 are attached on opposite sides of the flexible wrap 1 is an opening 5 which creates two ends of the flexible wrap 1 juxtaposed together. This opening 5 permits the flexible band 1 to become larger or smaller to accommodate different sizes of beverage container.

Figure 3:
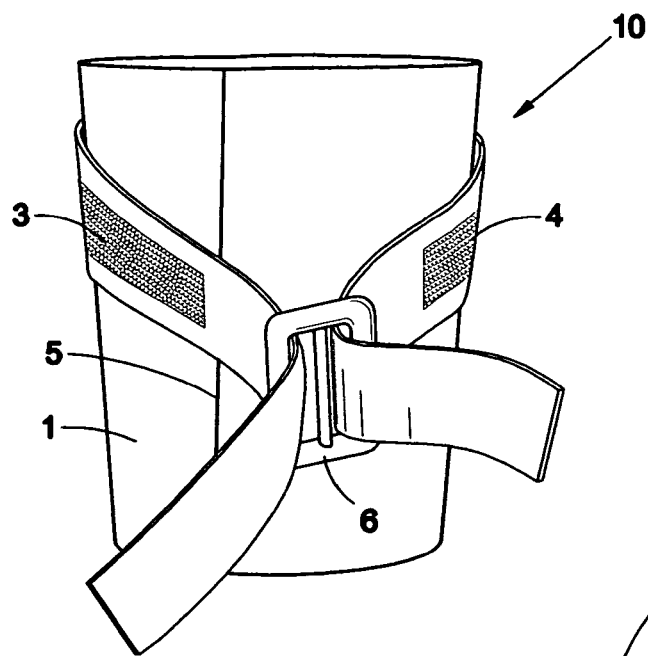
FIG. 3 is a front view of the adjustable cup holder disclosed herein
Figure 4:
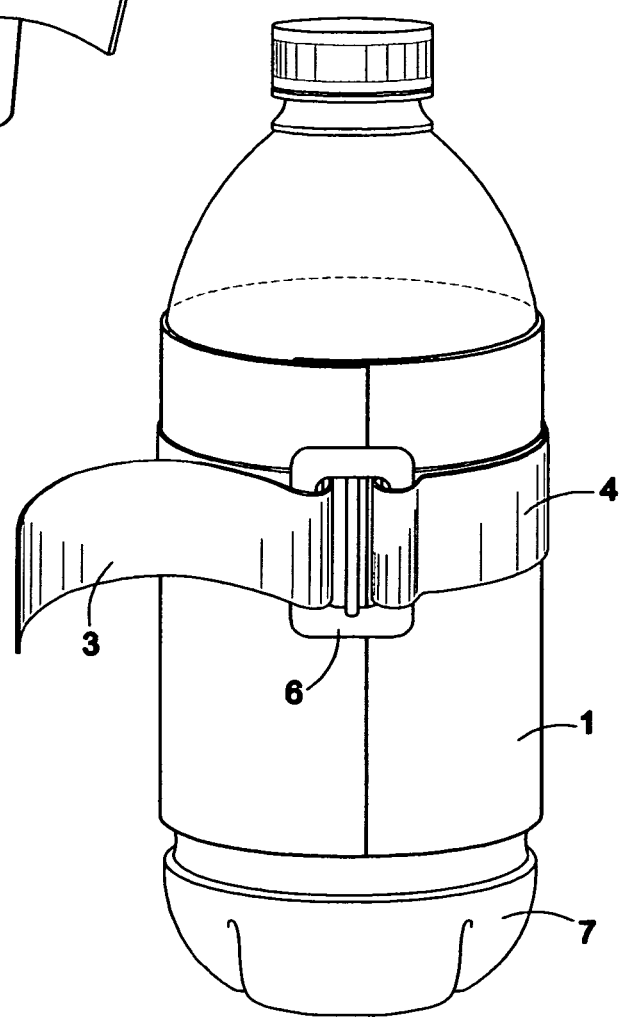
FIG. 4 is a front view of the adjustable cup holder containing a beverage container

As shown in FIGS. 3 and 4 the free ends of first strap 3 and second strap 4 distal from the location on the flexible wrap 1 where first strap 3 and second strap 4 are attached to the flexible wrap 1 are inserted through a rectangular ring 6. When an adjustable cup holder 10 is fitted around a beverage container/cup 7 the free end of the first strap 3 is tightened and folded back on itself to attach to the hook and loop fabric material of first strap 3 near the location of the connection of first strap 3 to the flexible wrap 1. Likewise, the free end of second strap 4 is tightened and folded back on itself to attach to the hook and loop fabric of the second strap 4 near the location of the connection of first strap 4 to the flexible wrap 1. The flexible wrap 1 of the adjustable cup holder 10 is now securely fitted around the beverage container/cup 7 allowing the consumer to handle the beverage container/cup 7 with the handle 2 attached to the flexible wrap 1. The tension made by affixing the free end of the first strap 3 and the second strap 4 to the flexible wrap 1 with the hook and loop fabric secures the flexible band 1 around the beverage container/cup 7.

There are potentially many embodiments of the adjustable cup holder disclosed herein. The flexible band and handle could be constructed from a variety of flexible, but sturdy materials and be of various sizes and shapes to accommodate many different sizes and shapes of beverage container/cup.

The straps used to secure the flexible band of the adjustable cup holder may also be constructed from a variety of materials in a myriad of shapes and sizes. Moreover, the adjustable cup holder disclosed herein may also be used in many different applications rather than just as a beverage holder where a container or object requires a handle to be attached to the container for safe and convenient handling. All of these other embodiments are included in this disclosure to the extent described in the appended claims.

I claim:

1. An adjustable cup holder comprising
   a prehensile attachment;
   a flexible wrap to which said prehensile attachment is attached;
   a first adjustable strap attached by one end of said first adjustable strap to said flexible wrap approximately halfway between said opening and said prehensile attachment;
   a second adjustable strap attached by one end of said second adjustable strap to said flexible wrap and on the opposite side of the flexible wrap from the attachment of said first adjustable strap;
   a rectangular ring through which the free end located distally from the end attached to said flexible wrap of said first adjustable strap through which the free end of said first adjustable strap is inserted and through which the free end of said second adjustable strap located distally from the end attached to said flexible wrap of said second adjustable strap is inserted;
   whereby said prehensile attachment may be attached to a beverage container encased in said flexible wrap and secured with said first and second straps by tensioning said first and second adjustable straps and securing said first and second adjustable straps to said flexible wrap by folding the free end of said first adjustable strap and attaching said free end of said first adjustable strap to the end of said first adjustable strap affixed to said flexible wrap and folding the free end of said second adjustable strap and attaching said free end of said second adjustable strap to the end of said second adjustable strap affixed to said flexible wrap.

2. The adjustable cup holder defined in claim 1 wherein said prehensile attachment is a handle.

3. The adjustable cup holder defined in claim 1 wherein said first adjustable strap is constructed from hook and loop fabric.

4. The adjustable cup holder defined in claim 1 wherein said second adjustable strap is constructed from hook and loop fabric.

* * * * *